United States Patent [19]

Peterson

[11] 4,298,618

[45] Nov. 3, 1981

[54] METHOD OF MAKING CHEESE HAVING ZONES OF DIFFERENT CHARACTERISTICS

[75] Inventor: Harold J. Peterson, Dodgeville, Wis.

[73] Assignee: Farmers Pride Cheese, Inc., Arena, Wis.

[21] Appl. No.: 143,027

[22] Filed: Apr. 23, 1980

[51] Int. Cl.$^3$ .............................................. A23G 19/02
[52] U.S. Cl. ....................................... 426/36; 99/452; 426/491
[58] Field of Search ................. 426/36, 478, 495, 518, 426/519, 491; 99/452, 456, 458

[56] References Cited

U.S. PATENT DOCUMENTS

| 2,324,636 | 7/1943 | Miollis | 426/36 |
| 3,500,542 | 3/1970 | Rdiner | 99/458 |
| 4,058,630 | 11/1977 | Busnel | 426/36 |

*Primary Examiner*—David M. Naff
*Attorney, Agent, or Firm*—Isaksen, Lathrop, Esch, Hart & Clark

[57] ABSTRACT

Cheese having zones of contrasting characteristics is prepared by filling a cheese vat with milk, inserting in the vat a partition that prevents free fluid interchange between parts of the vat to divide the milk into separate parts, treating the different parts of milk so that cheese made from one part will exhibit characteristics different from those of cheese made from milk of another part, treating each part to form a mass of curd and whey, removing the partition to unify the interior of the vat, cutting the curd of each part and stirring the pieces of curd until the pieces of all parts of the vat are mixed throughout the vat.

3 Claims, 1 Drawing Figure

METHOD OF MAKING CHEESE HAVING ZONES OF DIFFERENT CHARACTERISTICS

TECHNICAL FIELD

This invention relates to cheesemaking in general and, in particular, to a method for making cheese having discrete zones exhibiting contrasting characteristics.

BACKGROUND OF PRIOR ART

The prior art is generally cognizant of cheese having discrete zones exhibiting contrasting characteristics. For example, cheese has been made in which contiguous parts of the cheese have contrasting colors so that the cheese has a mottled or dappled appearance. Such cheese has achieved wide consumer acceptance. To make such cheese, cheese factories conventionally employ two cheesemaking vats. Milk is introduced into each vat and is acidified, generally by the introduction of a selected bacterial culture for the production of lactic acid. Then the contents of the two vats are treated in disparate manners. In the example of cheese having zones exhibiting contrasting colors, a cheese coloring agent may be added to one vat and not to the other. Thereafter a coagulum or curd is formed in both vats, usually through the addition of rennet. The curd is cut with curd knives in the conventional manner, and the curd pieces and whey of each vat are mixed and heated in order to drive whey out of the curd. The pieces of curd are subsequently washed with water, cooled, and salted before being put into cheese forms and pressed to their final shapes.

At some selected point after the initial formation of curd and before the pieces of washed curd are put into cheese forms, the pieces of curd from the two vats are mixed. It is thus necessary to shovel or otherwise physically transfer the contents of one vat into the other. This is a time-consuming, difficult, and costly step. In addition, care must be taken that the pieces of curd are not unduly crumbled while being shoveled or otherwise transferred from one vat into another.

Thus, the conventional mixing of contrasting pieces of curd in order to produce cheese having discrete zones involves unusual expenditures. Labor not otherwise needed in cheesemaking must be expended to transfer the curd from one vat into another. Furthermore, at least two vats are required to be used by the conventional method, further limiting availability of the method.

BRIEF SUMMARY OF THE INVENTION

The present invention is summarized in that a method for making cheese having discrete zones exhibiting contrasting characteristics includes the following steps: A cheese vat is filled with milk having a selected temperature and acidity. A vat divider is inserted to divide the interior of the vat into parts of selected relative size and to prevent free fluid interchange between the parts. The milk in each of the parts is then treated in a distinctive manner selected to cause cheese made from the milk of one part to exhibit selected characteristics differing from those exhibited by cheese made from the milk of the other part. Then the milk of each part is treated to form a mass of coagulum or curd and whey, the curd in each part exhibiting distinctive, selected characteristics. The vat divider is removed after the formation of the curd, and the entire mass of curd is cut with curd knives to produce pieces of curd of a selected size. Then the whey and pieces of curd are stirred until the pieces from all parts of the vat are mixed throughout the vat.

A primary object of the invention is to provide a method for making cheese having discrete zones exhibiting contrasting characteristics.

A second object of the invention is to provide a process for making such cheese in which only one cheese vat need be used.

Another object of the invention is to provide a process for the making of such cheese in which the cut curd need not be subjected to additional handling which might cause increased crumbling or breakage of the curd pieces.

A further object of the invention is to provide a process for the making of such cheese in which the labor requirements for the making of the cheese will not significantly exceed those for making cheese not having discrete zones exhibiting contrasting characteristics.

Another object of the invention is to provide a process for making such cheese in which necessary modifications of existing cheese vats and additions to existing cheesemaking equipment will be minor and inexpensive to accomplish.

Other objects, features, and advantages of the invention will be apparent from the following detailed description taken in conjunction with the accompanying drawing showing a preferred embodiment of apparatus for making cheese having discrete zones exhibiting contrasting characteristics.

DETAILED DESCRIPTION OF THE PREFERRED EMBODIMENT

Figure 1:
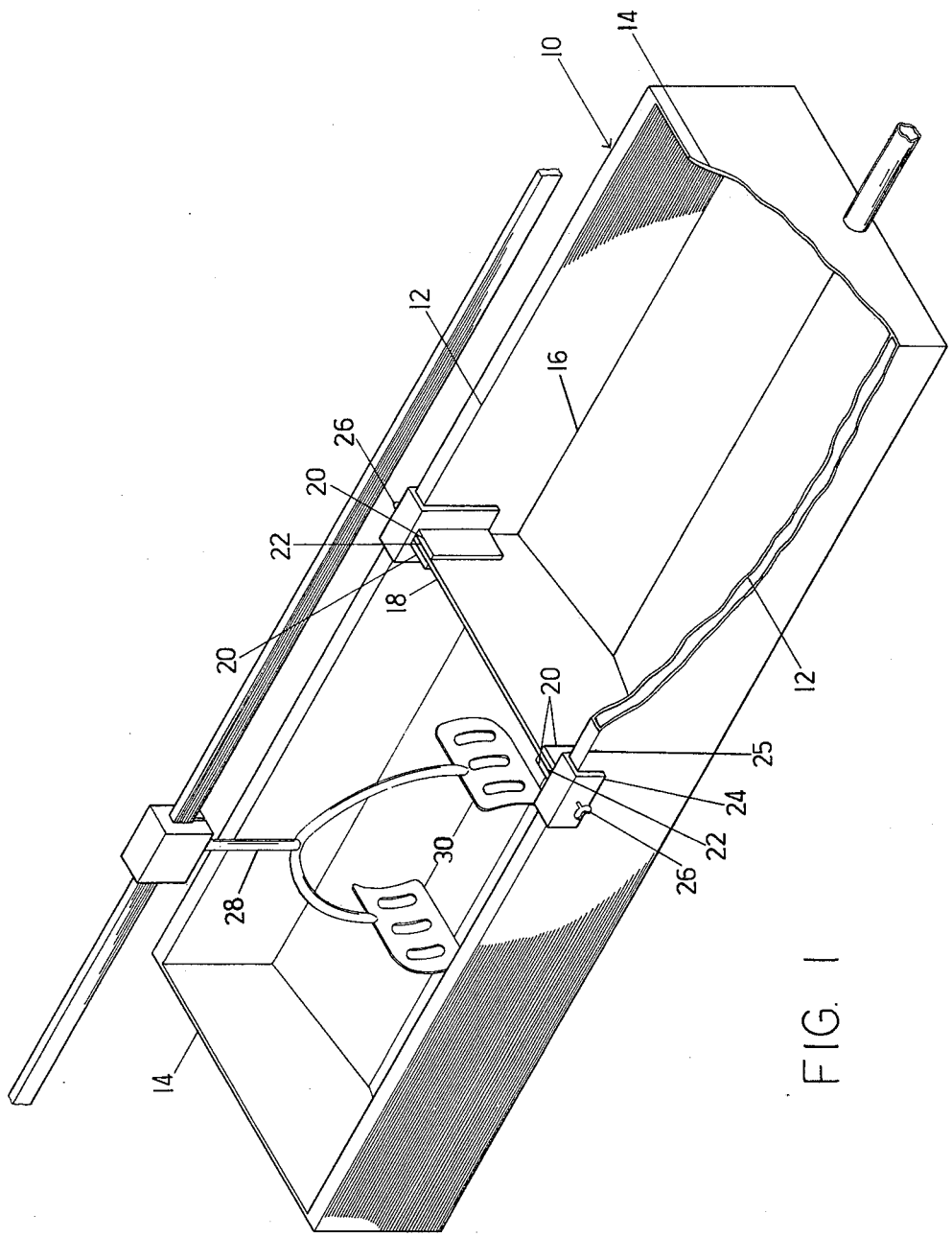
FIG. 1 is a perspective view of a vat used in the method of the invention with a part of the wall of the vat being broken away.

Referring more particularly to the drawing, FIG. 1 shows a cheese vat for carrying out the method of the invention generally at 10 having opposing, interiorally facing sides 12 and ends 14 and a bottom 16. A removable, solid, fluid-impervious partition or vat divider 18 is adapted to divide the vat 10 into two parts of selected relative size. The vat divider 18 is held in substantially rigid, removable relation to the vat 10 by a suitable means for holding the divider. In the preferred embodiment, two opposed pairs of braces 20 extend vertically on the sides 12 for a selected distance and project into the vat 10 for a selected distance. Each pair of braces 20 defines between them a vertically extending divider slot 22 having a size selected to admit the vat divider 18 when the vat divider 18 is inserted into the slots from above the vat 10. The outer periphery of the vat divider 18 is adapted to conform closely to the inner surface of the vat 10 to substantially prevent free fluid interchange between the two parts of the vat 10 when the vat divider 18 is held in place by the braces 20. Resilient means (not shown) may be employed between the outer periphery of the vat divider 18 and the inner surface of the vat 10 to provide a better seal, if it is desired to substantially completely separate the two parts of the vat.

The braces 20 may be permanently fastened to the sides 12. However, it is preferable that they be removable in order to facilitate cleaning of the vat 10 and to avoid permanent changes of the vat, which may also be used for other purposes. Therefore, the braces 20 preferably are rigidly attached to a clamp member 24. The clamp member 24 extends over the top of the wall 12 to which the associated braces 20 are to be attached and then downwardly on the outside of the vat 10 for a selected distance substantially parallel to the vat outside wall 25. Means for securing the clamp member 24 against the outside wall 25 are provided, such as the hand set screw 26. With the clamp member 24 in place over the side of the vat 10 and the hand set screw 26 firmly tightened, the associated braces 20 are thereby rigidly held against the associated wall 12.

The method for making cheese having discrete zones exhibiting contrasting characteristics according to the present invention begins in a conventional manner by filling the cheese vat 10 with milk having a selected temperature and acidity, as is common in the art. Preferably the milk placed in the vat is then acidified to a selected acidity, also in a conventional manner.

The next step in the process of the invention is the insertion of the vat divider 18 into the vertically extending divider slots 22. The vat divider 18 divides the vat 10 into parts of selected relative size, each part filled with partially conditioned milk. The purpose of the vat divider 18 is to prevent free fluid interchange between the parts. In most applications the vat divider 18 need not engage the sides 12 and bottom 16 of the vat 10 in fluid-tight relation in order to sufficiently hinder free fluid interchange for the purposes of the process of the invention. Instead, it will usually be sufficient if the vat divider 18 engages the sides 12 and bottom 16 tightly enough so that the volume of milk infiltrating from one part of the vat 10 to the other around the vat divider 18 is small in comparison to the volumes of each part of the divided vat. Of course, where it may be desirable to substantially isolate the parts of the vat interior owing to the nature of the different treatments employed, a more fluid-tight seal between the divider 18 and the vat 10 may be obtained by use of resilient means as previously discussed.

The next step in the process of the invention is to treat the conditioned milk in each of the parts of the vat 10 in a distinctive manner selected to cause cheese made from the milk of each part to exhibit selected characteristics. Any method of treating milk so as to affect cheese made therefrom may be used. By way of example only, cheese color may be added to the milk on one side of the vat divider 18 and not to the milk on the other side.

The next step of the process of the invention is to treat the milk contained in each part of the vat 10 so as to form a mass of curd and whey. Preferably rennet, pepsin, *Mucor miehei, Mucor pussillus,* or combinations thereof are added to each part of the vat 10 and mixed in by stirring in a conventional manner in order to cause curd to form in the milk.

After the curd is well formed, the vat divider 18 may be removed to unify the interior of the vat 10. In addition, the hand set screws 26 may be loosened and the braces 20 removed, thereby facilitating subsequent operations performed in the vat 10. The coagulum or curd is then cut with curd knives in the conventional manner, to form a multiplicity of small pieces of curd of a selected size. After the curd is cut, the whey and pieces of curd are stirred until pieces from all parts of the vat 10 are distributed uniformly therein. The stirring may be accomplished by any convenient means, such as the overhead agitator 28 equipped with conventional stirring paddles 30. While it is usually advantageous to remove the vat divider 18 after the curd has been formed, as described, for ease of carrying out subsequent steps, in some processes it may be advantageous to maintain the vat divider 18 in place during one or more subsequent treatment steps, depending on the process. In any event, at some point subsequent to forming of the curd the divider 18 should be removed, after which the curd must be stirred until the curd pieces from each part of the vat 10 are distributed throughout the vat 10.

After the curd has been cut, the mixture of whey and pieces of curd from each of the two parts of the vat 10 are then subjected to conventional cheesemaking washing and forming processes to make a pressed cheese therefrom. Typically, the mixture of whey and curd pieces will be heated and stirred to dispel whey from the curd pieces. The whey will then be removed from the vat 10, and cold water will be introduced into the vat 10 to wash and cool the curd pieces. The water is then removed and the curd pieces are salted, placed into cheese forms, pressed, and packaged.

The cheese formed by the process of the invention exhibits discrete zones, each zone deriving from a piece of curd. Zones deriving from pieces of curd formed in one part of the vat 10 will exhibit the characteristics produced by the mode of treatment to which the milk in that part of the vat 10 was subjected while the vat divider 18 was in place. More than one vat divider 18 may be employed to divide the vat 10 into more than two parts should more than two types of contrasting zones be desired. Since the milk in each of the parts was treated in a manner selected to cause cheese made from the milk of that part to exhibit characteristics differing from those exhibited by cheese made from the milk from another part, cheese made by the process of the invention has discrete zones exhibiting contrasting characteristics. If, for example, the milk in one part of the vat 10 has been treated with yellow cheese coloring while that in the other part of the vat 10 was left uncolored, the cheese made by the process of the invention will exhibit a uniformly mottled, yellow and white appearance.

The process for making cheese of the invention allows a contrasting curd cheese to be made using a single vat 10, and with almost no additional effort or cost as compared to conventional uniform cheesemaking. The prior art teaches only the use of two vats to make such cheese. Therefore, a cheese factory having only one vat that may be devoted to the making of such cheese may nevertheless make a contrasting curd cheese using the process of the invention, whereas this would not have been possible with the prior art two-vat technique. Furthermore, the prior art required the physical transfer of curd from one vat into another for mixing. This necessitated the expenditure of considerable labor and was done at some risk of crumbling or breakage of the pieces of curd. In contrast, by using the process of the invention, curd of differing characteristics may be formed within a single vat 10, making unnecessary the transfer of curd from one vat to another. Considerable savings of time and money result.

The following is an example of the performance of the method of the present invention, but it is understood that the invention is not limited to the particular method, constituents, and product example but embraces all variations thereof as come within the scope of the claims which follow thereafter.

EXAMPLE

A cheese vat was filled with milk having a temperature of 87° to 89° F. and 0.16% to 0.18% acidity. A lactic acid-producing cheese bacterial culture was added to the milk, along with the commercially available cheese culture known as Marschall Thermostar and sold by Marschall Division, Miles Laboratories, Inc. The bacterial culture was allowed to reproduce until the milk was brought to 0.18% to 0.20% acidity. A vat divider was inserted into the vat to divide the vat into approximately equal parts. Yellow cheese color was added to the milk of only one part of the vat and was mixed into the milk of that part by stirring. The milk in the other part of the vat was allowed to remain uncolored. Cheese rennet was added in equal portions to each part of the vat and was mixed with the milk. Curd was allowed to form. Approximately 20 to 40 minutes after the formation of the curd, the vat divider was removed to unify the interior of the vat, and the curd was cut with curd knives into cube-shaped curd pieces measuring approximately three-eighths inch to the side. The whey and the curd of both parts of the vat were then mixed together by the use of an agitator equipped with stirring paddles. The curd was stirred and heated to 98° to 102° F., with that temperature maintained for 25 to 30 minutes to dispel whey from the curd. Fifteen to thirty minutes after heating was accomplished, the whey was drained from the vat. The curd was then stirred with the agitator until it exhibited 0.18% to 0.20% acidity. Cold water was introduced to the vat and the curd was washed and cooled thereby to 84° to 86° F. The water was then removed from the vat, and the curd was stirred with the agitator until it exhibited 0.22% to 0.26% acidity. The curd was then salted, put into cheese forms, pressed, and packaged. The cheese made by this example exhibited discrete zones having contrasting colors, yellow and white.

What is claimed is:

1. A method for making cheese having discrete zones exhibiting contrasting characteristics comprising:
   (a) filling a cheese vat with milk,
   (b) dividing the vat into parts of selected relative size and preventing free fluid interchange between the parts by inserting a partition of solid, substantially fluid-impervious material within the vat in close engagement with the inside surface of the vat,
   (c) treating the milk in each of the parts in distinctive manners selected to cause cheese made from the milk of one part to exhibit selected characteristics differing from those exhibited by cheese made from the milk of another part,
   (d) treating the milk of each part to form a mass of curd and whey, the curd in each part exhibiting distinctive, selected characteristics,
   (e) unifying the interior of the vat after formation of the curd by removing the partition from the vat,
   (f) cutting the curd of each part with curd knives to produce pieces of curd of selected sizes, and
   (g) stirring the pieces of curd at least until the pieces of curd from all parts of the vat are mixed throughout the vat.

2. The method for making cheese having discrete zones exhibiting contrasting characteristics specified in claim 1 wherein the step of treating the milk in each of the parts of the vat in a distinctive manner includes coloring the milk of one part differently from the milk of another part by adding color to the milk of at least one part.

3. The method for making cheese having discrete zones exhibiting contrasting characteristics specified in claim 2 further including after the step of cutting the curd, the steps of heating the contents of the vat to dispel whey from the curd pieces, removing the whey from the vat, introducing cold water into the vat to wash and cool the curd pieces, removing the water from the vat, salting the curd pieces, and then removing the curd pieces from the vat and pressing them into selected cheese forms wherein the curd pieces from each different part of the vat are distributed throughout in random fashion, and wherein the step of stirring the pieces of curd may be employed at any time after the curd is cut and before the curd pieces are removed from the vat.

* * * * *